US011109000B2

(12) United States Patent
Wang et al.

(10) Patent No.: US 11,109,000 B2
(45) Date of Patent: Aug. 31, 2021

(54) LASER PROJECTION DEVICE AND LASER PROJECTION SYSTEM

(71) Applicant: GOERTEK INC., Weifang (CN)

(72) Inventors: Zhe Wang, Weifang (CN); Xiaoyang Zhang, Weifang (CN); Quanbo Zou, Weifang (CN)

(73) Assignee: GOERTEK INC., Weifang (CN)

( * ) Notice: Subject to any disclaimer, the term of this patent is extended or adjusted under 35 U.S.C. 154(b) by 132 days.

(21) Appl. No.: 16/487,246

(22) PCT Filed: Mar. 7, 2017

(86) PCT No.: PCT/CN2017/075899
§ 371 (c)(1),
(2) Date: Aug. 20, 2019

(87) PCT Pub. No.: WO2018/161260
PCT Pub. Date: Sep. 13, 2018

(65) Prior Publication Data
US 2021/0136334 A1 May 6, 2021

(51) Int. Cl.
*H04N 9/31* (2006.01)
(52) U.S. Cl.
CPC ......... *H04N 9/3135* (2013.01); *H04N 9/3161* (2013.01); *H04N 9/3173* (2013.01)
(58) Field of Classification Search
CPC ... H04N 9/3135; H04N 9/3161; H04N 9/3173
(Continued)

(56) References Cited

U.S. PATENT DOCUMENTS

2005/0275710 A1  12/2005  Dewa et al.
2008/0249369 A1  10/2008  Seibel et al.
(Continued)

FOREIGN PATENT DOCUMENTS

CN    1968821 A    5/2007
CN    102096290 A   6/2011
(Continued)

OTHER PUBLICATIONS

International Search Report (PCT/ISA/210) dated Dec. 7, 2017, by the State Intellectual Property Office of the P.R. China as the International Searching Authority for International Application No. PCT/CN2017/075899.
(Continued)

*Primary Examiner* — Michael Lee
(74) *Attorney, Agent, or Firm* — Buchanan Ingersoll & Rooney PC (57) ABSTRACT

The present disclosure provides a laser projection device and a laser projection system. The laser projection device includes a light source scanner and a MEMS scanning mirror, the light source scanner including micro laser diodes; and the micro laser diodes are used to provide laser beams needed for image projection, and the laser beams are projected to the MEMS scanning mirror, and then reflected by the MEMS scanning mirror to a predetermined area to form a projection image. By providing the micro laser diodes in the laser projection device and initiatively emitting laser by exciting the micro laser diodes, the present disclosure does not need an external laser source and facilitates the reduction of the size of the laser projection device, as compared with the prior art.

17 Claims, 4 Drawing Sheets

(58) Field of Classification Search
USPC .......................................................... 348/744
See application file for complete search history.

(56) References Cited

U.S. PATENT DOCUMENTS

| | | |
|---|---|---|
| 2010/0046057 A1 | 2/2010 | Shyu et al. |
| 2011/0058108 A1 | 3/2011 | Champion |
| 2012/0275001 A1* | 11/2012 | Ishibashi ............... H04N 9/3129 |
| | | 359/199.1 |
| 2013/0250388 A1 | 9/2013 | Nozaki |
| 2014/0063473 A1* | 3/2014 | Pasolini ................ G02B 27/646 |
| | | 353/98 |
| 2014/0253992 A1 | 9/2014 | Freedman et al. |
| 2015/0234263 A1* | 8/2015 | Yamagiwa ......... G02B 27/0101 |
| | | 359/630 |
| 2017/0168290 A1* | 6/2017 | Ohl .................... G02B 26/0833 |
| 2017/0227185 A1* | 8/2017 | Boinet .................... F21S 41/33 |
| 2018/0075610 A1* | 3/2018 | Lee ........................... G06T 7/50 |
| 2020/0241407 A1* | 7/2020 | Wang ................. G02B 26/0841 |

FOREIGN PATENT DOCUMENTS

| | | |
|---|---|---|
| CN | 103458205 A | 12/2013 |
| CN | 104303091 A | 1/2015 |

OTHER PUBLICATIONS

Written Opinion (PCT/ISA/237) dated Dec. 7, 2017, by the State Intellectual Property Office of the P.R. China as the International Searching Authority for International Application No. PCT/CN2017/075899.

* cited by examiner

LASER PROJECTION DEVICE AND LASER PROJECTION SYSTEM

CROSS REFERENCE TO RELATED APPLICATIONS

This application is a U.S. National Stage entry under 35 U.S.C. § 371 based on International Application No. PCT/CN2017/075899, filed on Mar. 7, 2017. The embodiment of the priority applications are hereby incorporated herein in their entirety by reference.

FIELD OF THE DISCLOSURE

The present disclosure relates to the technical field of laser projection, and particularly to a laser projection device and a laser projection system.

BACKGROUND OF THE DISCLOSURE

Laser projection technology employs laser as the light source for projection display, and as compared with conventional display light sources, laser has very good monochromaticity and directionality and enables display with high color gamut. However, the laser projection technology in the prior art still have drawbacks.

For example, the US patent application published as US2008/0249369 and assigned to University of Washington discloses a compact scanning optical fiber device. The scanning optical fiber device has optical fibers for conducting laser beams, the cantilevered free ends of the optical fibers are disposed in a piezoelectric tube, and can be excited by the piezoelectric tube to resonate on an orthogonal axis, and the scanning fiber device can work as a projector.

As another example, the US patent application published as US2013/0250388 and assigned to Citizen Co., Ltd. discloses a scanning image projector and a method of driving the scanning image projector. The scanning image projector has a laser source and a MEMS scanning mirror, a raster scan pattern is formed through dual-axis vibration of the MEMS scanning mirror, and the MEMS works on the dual axes respectively in a slow scan manner and a fast scan manner.

However, for these prior art laser scanning systems, external light sources are needed, so the laser projection devices are not compact enough, which affects the miniaturization of the laser projection devices.

A further problem in the prior art is that the raster scanning patterns are all completed by the dual axes scanning of the optical fiber or the dual axes scanning of the MEMS scanning mirror.

A further problem in the prior art is that the mirror plate of the MEMS scanning mirror suffers from dynamic deformation upon high-frequency scanning, which reduces the image quality and limits the availability of scanning at higher frequencies for display with high resolution. Further, scanning of long term, high frequency and large amplitude will harm the life of the scanning mirror.

Finally, the actuator in the prior art is a tubular dual-axis optical fiber scanner adapted to generate a spiral scanning mode. If a raster scan pattern is to be generated, a relatively complicated mechanical structure or controlling algorithm is required. Moreover, when an optical fiber scanner is employed to generate raster scanning, the scanning angle of the slow axis which works at non-resonant mode may be limited. In addition, when an optical fiber scanner works at dual-axis scanning, the mechanical performances may be easily affected by the structure such as symmetry of the optical fiber itself.

SUMMARY OF THE DISCLOSURE

To improve the prior art and solve one or more technical problems in the prior art, a main objective of the present disclosure is to provide a projection device and a projection system. The projection device has built-in micro laser diodes to be scanned by the actuator for one of the axes.

Another objective of the present disclosure further comprises providing a projection device and a projection system which implement raster projection by using a light source scanner for fast axis scanning and a MEMS scanning mirror which scans simultaneously for slow axis scanning.

Another objective of the present disclosure further comprises improving the service life of the MEMS scanning mirror and ensuring projection image quality of high resolution, without suffering from dynamic deformation of the mirror plate.

A further objective of the present disclosure is to reduce the complexity of fabrication or control for a raster scanning projection system.

To achieve one or more of the above objectives, the present disclosure respectively teaches the following multiple technical solutions in different embodiments:

According to one aspect of the present disclosure, there is provided a laser projection device, wherein the laser projection device comprises a light source scanner and a MEMS scanning mirror, the light source scanner comprising micro laser diodes; and the micro laser diodes are used to provide laser beams needed by projection, and the laser beams are projected to the MEMS scanning mirror, and then reflected by the MEMS scanning mirror to a predetermined area to form a projection image.

Optionally, the light source scanner scans in the first plane and enables the laser beams of the light source scanner to project to the MEMS scanning mirror; and the MEMS scanning mirror scans about the first axis and reflects the laser beam to a predetermined area to form a projection image;

wherein the first axis is located in the first plane, or the first axis is parallel to the first plane.

Optionally, the scan frequency of the light source scanner is higher than the scan frequency of the MEMS scanning mirror.

Optionally, the laser projection device further comprises a scanning signal synchronizing module, and the scanning signal synchronizing module sends driving signals to the light source scanner and the MEMS scanning mirror respectively.

Optionally, the scan frequency of the light source scanner is equal to or greater than 20 kHz.

Optionally, the scan frequency of the MEMS scanning mirror is in the range of 60 Hz-120 Hz.

Optionally, the actuation mechanism of the light source scanner and/or the MEMS scanning mirror can be electromagnetic, electrothermal, electrostatic or piezoelectric.

Optionally, the laser projection device further comprises an optical lens module disposed on the laser beam path, and the optical lens module is used to converge and trim the laser beam.

Optionally, the optical lens module is disposed between the light source scanner and the MEMS scanning mirror or disposed between the MEMS scanning mirror and the predetermined area.

Optionally, the light source scanner operates in the first-order resonant mode or the second-order resonant mode.

Optionally, the light source scanner and the MEMS scanning mirror are controlled synchronously to generate a raster scan pattern.

Optionally, a planar size of the MEMS scanning mirror is equal to or below 4 mm*4 mm.

Optionally, the light source scanner and the MEMS scanning mirror each are set as a single-axis driving structure; and the light source scanner further comprises a substrate and a piezoelectric actuator, the piezoelectric actuator is disposed on the substrate, the micro laser diode is disposed on an upper surface of the piezoelectric actuator, the micro laser diodes comprise a red micro laser diode, a green micro laser diode and a blue micro laser diode. The micro laser diodes are packaged on a surface of the piezoelectric actuator by wire bonding or flip-chip and the electrodes of the micro laser diodes are electrically connected to the electrical pads or paths of the piezoelectric actuator. The electrical pads or paths are formed by evaporation or sputtering Optionally, the laser beams emitted by the micro laser diodes are perpendicular to a lengthwise direction of the piezoelectric actuator and located in the first plane. The MEMS scanning mirror is disposed perpendicular to the lengthwise direction of the piezoelectric actuator, and the laser beam is finally reflected to the predetermined area in the lengthwise direction of the piezoelectric actuator to form a projection image; or, the laser beam emitted by the micro laser diode is emitted in the lengthwise direction of the piezoelectric actuator and located in the first plane, the MEMS scanning mirror is disposed in the lengthwise direction of the piezoelectric actuator, and the laser beam is finally reflected to the predetermined area perpendicular to the lengthwise direction of the piezoelectric actuator to form a projection image.

Optionally, the laser projection device further comprises a micro laser diode driving module, wherein the micro laser diode driving module drives the micro laser diodes independently.

Optionally, the diameter of the laser projection device is equal to or below 6 mm.

According to another aspect of the present disclosure, a laser projection system is disclosed, wherein the laser projection device of any one of the above items is disposed in the laser projection system.

Optionally, the laser projection system is a pair of augmented reality glasses, and the laser projection device is disposed in the frame of the augmented reality glasses;

or, the laser projection system is a cell phone, and the laser projection device is embedded in the cell phone;

or, the laser projection system is a watch, and the laser projection device is embedded in a dial or a watchband of the watch.

By providing the built-in micro laser diodes, the present disclosure can actively scan with the light source scanner. The present disclosure does not need an external laser source, and the size of the laser projection device can be reduced, as compared with the prior art.

DETAILED DESCRIPTION OF PREFERRED EMBODIMENTS

Embodiments of the present disclosure will be further described in detail with reference to the figures to make the objectives, technical solutions and advantages of the present disclosure more apparent.

Embodiment 1

Figure 1:
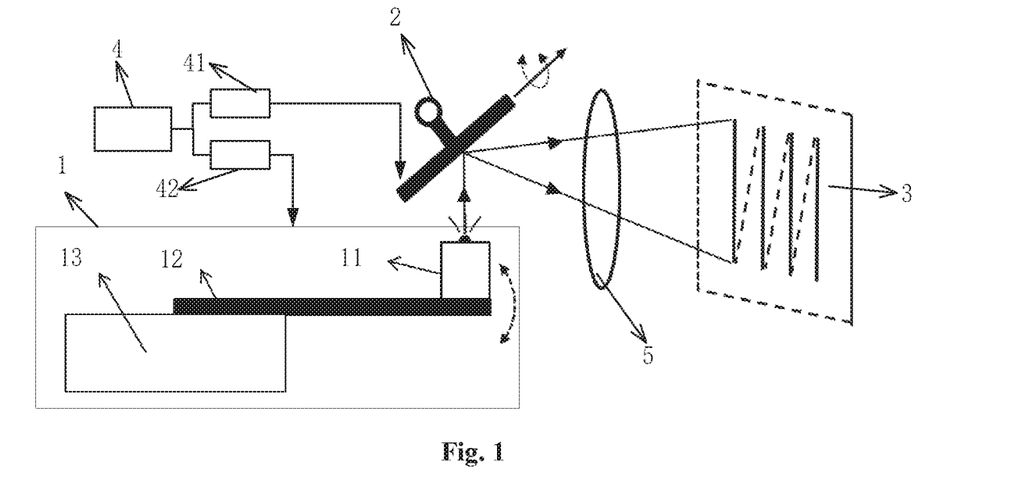
FIG. 1 is a schematic view of a laser projection device according to Embodiment 1 of the present disclosure.

FIG. 1 shows a schematic view of a laser projection device according to Embodiment 1 of the present disclosure. The laser projection device comprises a light source scanner 1 and a MEMS scanning mirror 2, and the light source scanner 1 comprises micro laser diodes 11. The micro laser diodes 11 are used to provide laser beams needed for projection, and the laser beams emitted by the micro laser diodes 11 are projected to the MEMS scanning mirror 2 and reflected by the MEMS scanning mirror 2 to a predetermined area 3 to form a projection image.

The micro laser diodes 11 are built in the light source scanner 1, and the micro laser diodes 11, being excited, can emit the laser beam. This arrangement does not need to obtain the laser source from the exterior, simplifies the structure of the laser projection device, makes the structure of the laser projection device compacter, and facilitates a miniaturized design.

Preferably, referring to FIG. 1, the light source scanner 1 scans in a first plane and enables the laser beam emitted by the micro laser diode 11 to project to the MEMS scanning mirror 2. The MEMS scanning mirror 2 can scan about a first axis and can reflect the laser beam to the predetermined area 3 to form a projection image; wherein the first axis is located in the first plane or the first axis is parallel to the first plane. As shown in FIG. 1, the first plane where the light source scanner 1 scans is the paper surface, the first axis about which the MEMS scanning mirror 2 scans is in the paper surface, and the MEMS scanning mirror 2 scans in and out of the paper surface. In this embodiment, the light source scanner 1 and the MEMS scanning mirror 2 are synchronously controlled to generate a raster scan pattern. The horizontal direction and the vertical direction of the raster scan pattern are respectively completed by the scan of the light source scanner 1 and the scan of the MEMS scanning mirror 2. For example, the scan in the vertical direction is completed by the scan of the light source scanner 1, whereas the scan in the horizontal direction is completed by the scan of the MEMS scanning mirror 2, or vice versa. In this embodiment, the light source scanner 1 is arranged as a single-axis structure and only needs to scan in one plane.

Furthermore, the MEMS scanning mirror 2 is also arranged as a single-axis structure and only scans about one axis, which can reduce the complexity degree of each of the scanning units, facilitate miniaturization, avoid the problem of the dynamic deformation of the MEMS scanning mirror.

Preferably, the micro laser diode 11 may be a single micro laser diode or an array formed by a plurality of micro laser diodes.

Preferably, the laser beam emitted by the micro laser diode 11 may be monochromatic and achieve monochromatic projection; or, the micro laser diodes 11 may be three micro laser diodes having the colors of red, green and blue, and achieve colored projection.

Figure 2:
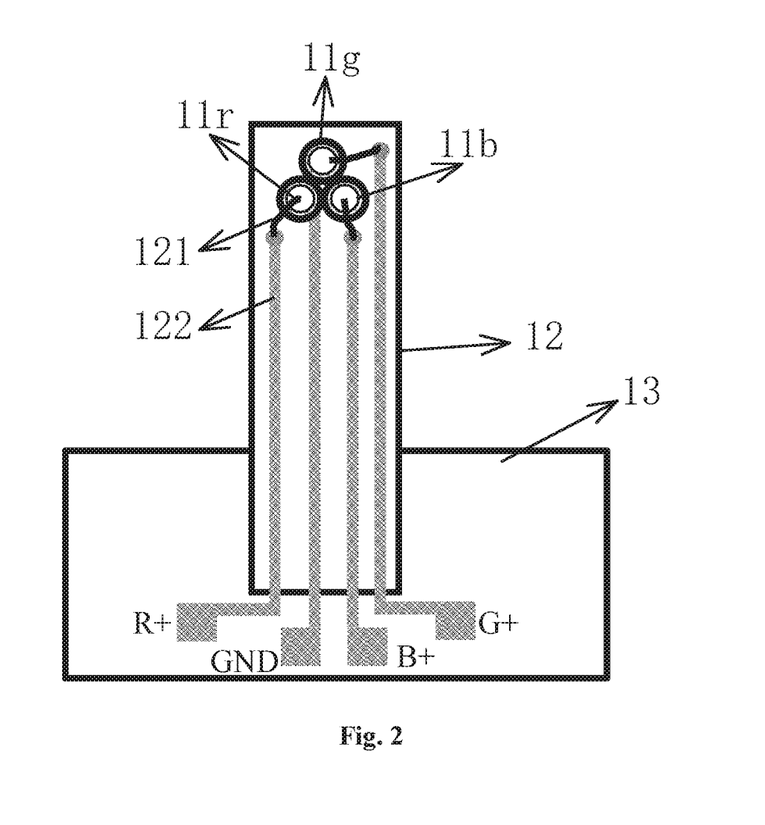
FIG. 2 is a top view of a light source scanner of the laser projection device according to Embodiment 1 of the present disclosure.
Figure 3:
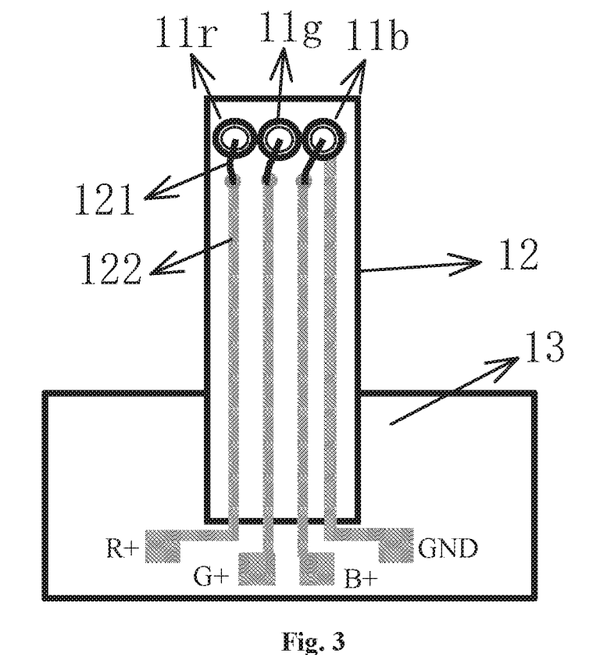
FIG. 3 is a top view of another light source scanner of the laser projection device according to Embodiment 1 of the present disclosure.

FIG. 2 and FIG. 3 are respectively a top view of two different forms of the light source scanners according to Embodiment 1 of the present disclosure. As shown in FIG. 2, the light source scanner 1 is a single-axis driving structure. The light source scanner 1 further comprises a substrate 13 and a piezoelectric actuator 12, the piezoelectric actuator 12 is disposed on the substrate 13, and the micro laser diode 11 is disposed on a surface of the piezoelectric actuator 12. The micro laser diode 11 comprises a red micro laser diode 11r, a green micro laser diode 11g and a blue micro laser diode 1ib, the micro laser diodes of the three colors form a "品"-shaped arrangement. The micro laser diodes are packaged on the surface of the piezoelectric actuator by wire bonding or flip-chip, and the electrodes of the micro laser diodes are electrically connected to the electrical pads or paths of the piezoelectric actuator. The electrical pads or paths are formed by evaporation or sputtering. As shown in FIG. 2, the electrodes of the micro laser diodes are electrically connected to the conducting circuit 122 on the surface of the piezoelectric actuator via welding wires 121. Furthermore, in Embodiment 1, the laser projection device further comprises a micro laser diode driving module, and the micro laser diode driving module drives the micro laser diode to emit the laser beam according to the image information to be displayed. Specifically, red, green and blue signals are used to respectively excite the three color micro laser diodes so that the three color micro laser diodes individually emit lights, superimpose the colors to generate a colored laser beam and achieve colored image projection.

In the top view of the light source scanner shown in FIG. 3, the micro laser diode 11 also comprises a red micro laser diode 11r, a green micro laser diode 11g and a blue micro laser diode 1ib. The micro laser diodes of the three colors form a "-"-shaped arrangement, and the other structures are all the same as those of the light source scanner in FIG. 2.

Preferably, the scan frequency of the light source scanner 1 is higher than the scan frequency of the MEMS scanning mirror 2. Specifically, the scan frequency of the light source scanner 1 is equal to or greater than 20 kHz. The MEMS scanning mirror 2 scans with the refresh frequency of displayed images, that is, 60 Hz-120 Hz. The MEMS scanning mirror 2 is not required to perform high-frequency scanning, thereby avoids the problem of dynamic deformation of the mirror plate when the MEMS scanning mirror 2 scans at a high speed and facilitating improvement of the projection display quality.

In Embodiment 1 shown in FIG. 1, the laser projection device further comprises a scanning signal synchronizing module 4. The scanning signal synchronizing module 4 is provided with a light source scanner driving module 41 and an MEMS scanning mirror driving module 42 which respectively correspond to the light source scanner 1 and the MEMS scanning mirror 2, and send a driving signal to the light source scanner 1 and the MEMS scanning mirror 2 respectively to drive the light source scanner 1 and the MEMS scanning mirror 2 to scan. Specifically, the actuation mechanism of the light source scanner 1 and/or the MEMS scanning mirror 2 can be electromagnetic, electrothermal, electrostatic or piezoelectric. Furthermore, the laser projection device in the present embodiment may further comprise means for driving to change an inclination angle of the MEMS scanning mirror 2 to thereby adjust the position of the projection image.

Figure 5:
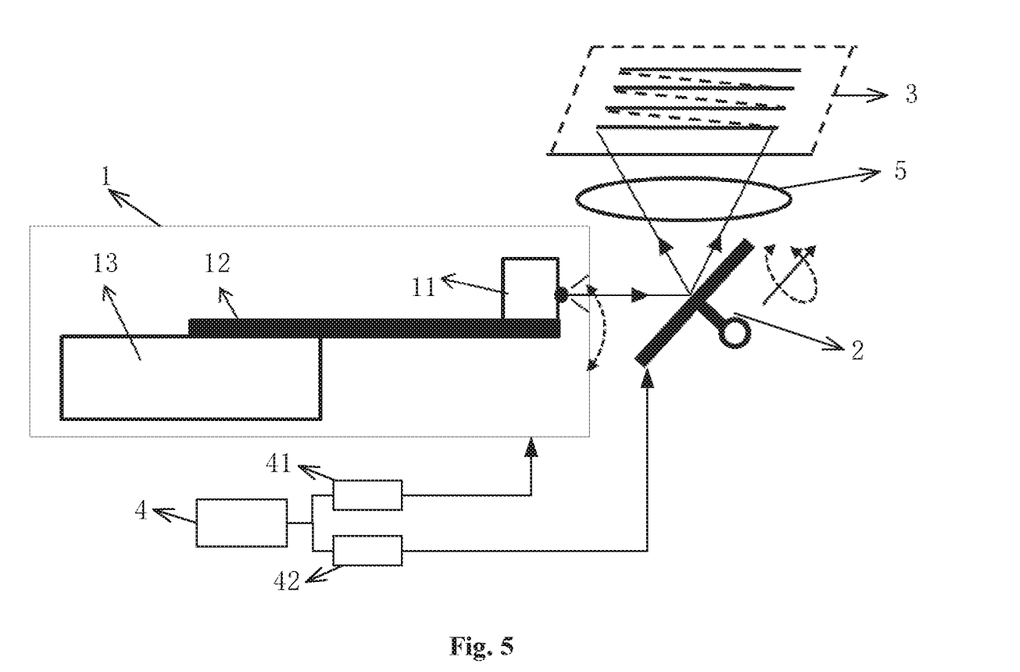
FIG. 5 is a schematic view of a laser projection device according to Embodiment 2 of the present disclosure.

Preferably, the laser projection device further comprises an optical lens module 5 disposed on a laser beam path, and the optical lens module 5 is used to converge and trim the laser beam to make the displayed image clearer. Specially, the optical lens module 5 is disposed between the MEMS scanning mirror 2 and the predetermined area 3, as shown in FIG. 1 and FIG. 5. Alternatively, the optical lens module may also be disposed between the light source scanner and the MEMS scanning mirror.

Preferably, the light source scanner 1 operates in a first-order resonant mode or a second-order resonant mode. The first-order resonant mode and the second-order resonant mode respectively meet different requirements on scanning amplitude at different loads of the laser diodes, and thereby project and display projection images with fields-of-view of different sizes.

Figure 4:
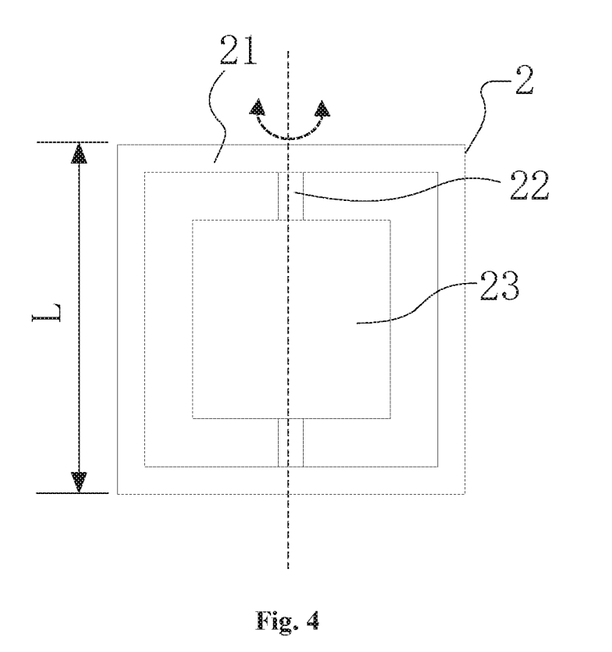
FIG. 4 is a schematic view of an MEMS scanning mirror with a single-axis driving structure.

FIG. 4 is a schematic view of an MEMS scanning mirror with a single-axis driving structure. Embodiment 1 may employ the MEMS scanning mirror 2 with the single-axis driving structure. Referring to FIG. 4, the MEMS scanning mirror 2 with the single-axis driving structure comprises a first outer frame 21, a first connection member 22 and a reflective mirror 23. The reflective mirror 23 is connected with the first outer frame 21 via the first connection member 22. The reflective mirror 23 reciprocatingly rotates within a certain angular range with the arrangement direction (as shown by the dotted line) of the first connection member 22 as the axis, and reflects the laser beam. The MEMS scanning mirror 2 with the single-axis driving structure is simple in structure and easy to manufacture and assemble and has a size with a side length as small as L=2-4 mm, that is, its planar area may be equal to or below 4 mm*4 mm, so that the structure of the laser projection device is more compact and facilitates the miniaturization and portability of the device.

As shown in FIG. 1, in Embodiment 1, the laser beam emitted by the micro laser diode 11 is perpendicular to the lengthwise direction of the piezoelectric actuator 12 and located in the first plane, and the MEMS scanning mirror 2 is disposed perpendicular to the lengthwise direction of the piezoelectric actuator 12 and the reflection surface of the MEMS scanning mirror 2 deviates to the front of the piezoelectric actuator 12 in the lengthwise direction of the piezoelectric actuator 12. The laser beam is finally reflected to the predetermined area 3 in the front of the piezoelectric actuator 12 in the lengthwise direction of the piezoelectric actuator 12 to form a projection image, and that projection direction is adapted for a scenario which has a sufficient space in the lengthwise direction and used to project the image forward. Certainly, in this embodiment, the reflection surface of the MEMS scanning mirror 2 may also deviate to the rear of the piezoelectric actuator 12 in the lengthwise direction of the piezoelectric actuator 12 and used to project the image to the rear of the piezoelectric actuator 12.

Embodiment 2

FIG. 5 shows Embodiment 2 of the laser projection device according to the present disclosure. Embodiment 2 differs from Embodiment 1 in that the laser beam emitted by the micro laser diode 11 is emitted in the lengthwise direction of the piezoelectric actuator 12 and located in the first plane, the MEMS scanning mirror 2 is disposed in the lengthwise direction of the piezoelectric actuator 12, and the laser beam is finally reflected to the predetermined area 3 perpendicular to the lengthwise direction of the piezoelectric actuator 12 to form a projection image. That projection direction is adapted for a scenario with an insufficient lengthwise space and used to project the image in the direction perpendicular to the piezoelectric actuator 12, that is, laterally.

In the above embodiments, the diameter of the laser projection device may be made to be equal to or below 6 mm so that the laser projection device can be disposed in some small-sized laser projection systems.

The laser projection system may be a pair of augmented reality glasses, and the laser projection device is disposed in the frame of augmented reality glasses so that the augmented reality glasses worn by a user can conveniently project the images and the user can view the images conveniently. Alternatively, the laser projection system is a cell phone, and the laser projection device is embedded in the cell phone. Alternatively, the laser projection system is a watch, and the laser projection device is embedded in a dial or a watchband of the watch.

Embodiment 3

Figure 6:
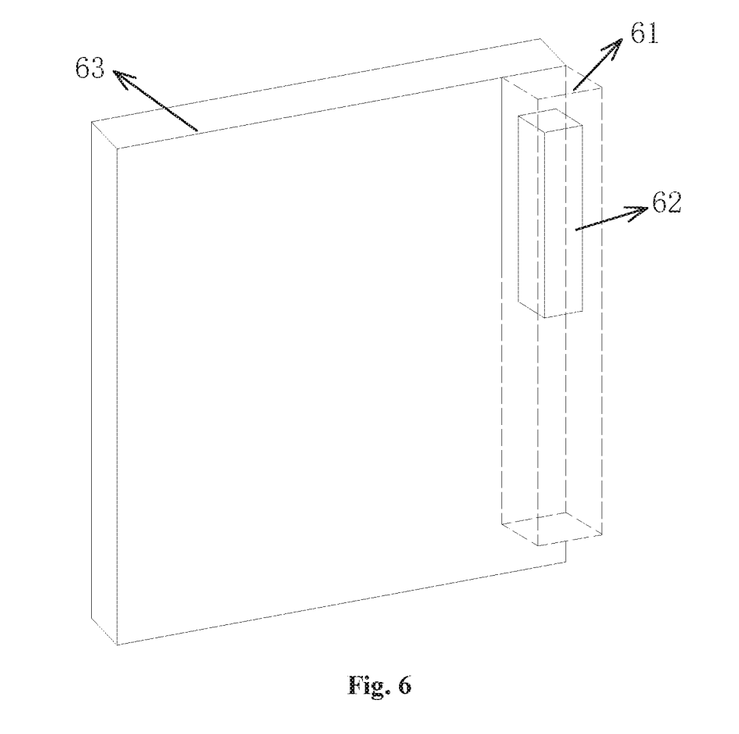
FIG. 6 is a structural schematic view of augmented reality glasses according to Embodiment 3 of the present disclosure.
Figure 7:
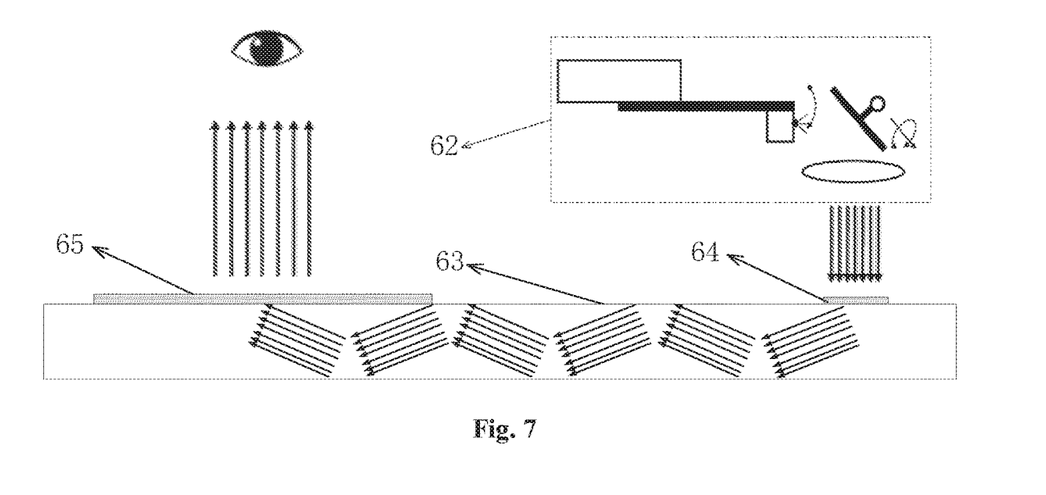
FIG. 7 is a schematic view of a projection optical path of augmented reality glasses according to Embodiment 3 of the present disclosure.

FIG. 6 is a structural schematic view of augmented reality glasses. As shown in FIG. 6, the augmented reality glasses comprise a frame 61, a laser projection device 62 and a lens 63. The lens 63 is a transparent lens. The reference number of 64 indicates a functional structure for implementing optical coupling, and the reference number of 65 indicates a functional structure for implementing optical decoupling; wherein they are used as an optical device for augmented reality. FIG. 7 is a schematic view of a projection display optical path. The laser beam emitted by the laser projection device 62 is incident from a side of the lens 63, goes through full reflection for several times, exits from a display module of the lens 63 and enters human eyes so that the user upon wearing the augmented reality glasses can conveniently observe the projection images and achieve an augmented reality effect. In FIG. 7, the laser projection device 62 and the display module of the lens 63 are both located on the side of the lens 63 towards the human eyes. Certainly, the laser projection device 62 and the display module of the lens 63 may also be disposed on the side of the lens 63 away from the human eyes.

Figure 8:
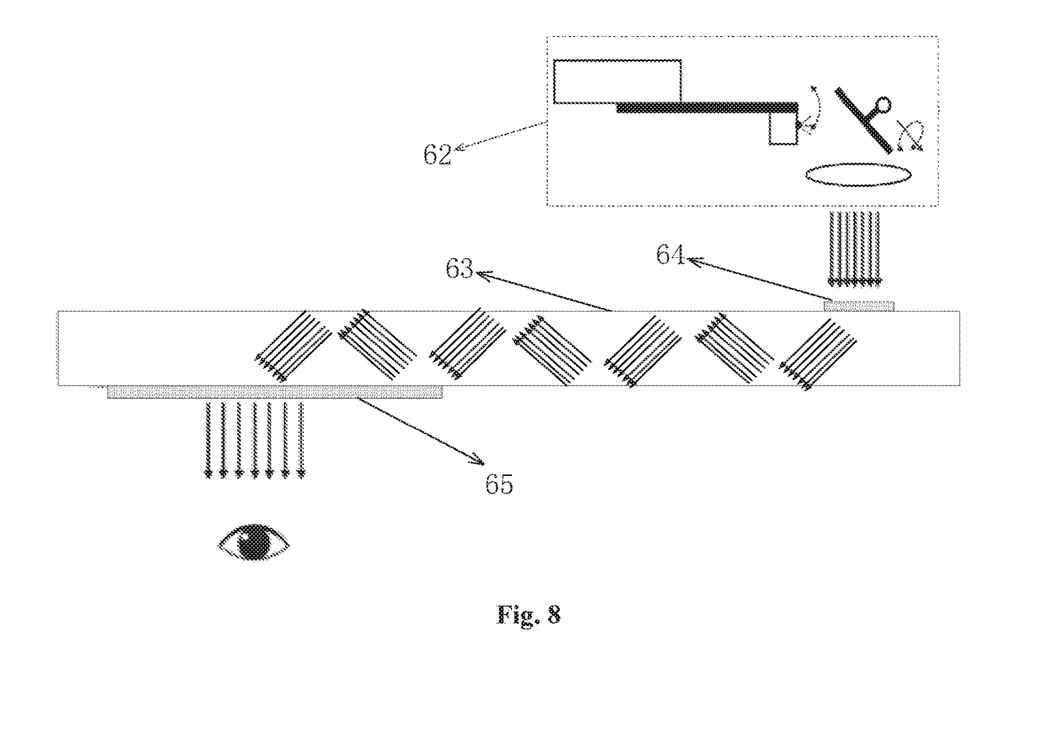
FIG. 8 is a schematic view of another projection optical path of augmented reality glasses according to Embodiment 3 of the present disclosure.

FIG. 8 is a schematic view of another projection optical path of the augmented reality glasses. As shown in FIG. 8, the laser projection device 62 and the display module of the lens 63 are located on both sides of the lens 63.

The above are only specific embodiments of the present disclosure. Due to the teaching of the present disclosure, those skilled in the art can make other modifications or variations thereto on the basis of the above embodiments. Those skilled in the art should appreciate that the above specific descriptions are only intended to better illustrate the objectives of the present disclosure, and the protection scope of the present disclosure should be subject to the protection scope as defined by the appended claims.

What is claimed is:

1. A laser projection device, wherein the laser projection device comprises a light source scanner and a MEMS scanning mirror, the light source scanner comprising one or more micro laser diodes; and the micro laser diodes are used to provide a laser beam needed by projection, and the laser beam is projected to the MEMS scanning mirror, and then reflected by the MEMS scanning mirror to a predetermined area to form a projection image;

wherein the light source scanner scans in a first plane and enables the laser beams of the light source scanner to project to the MEMS scanning mirror; and the MEMS scanning mirror scans about a first axis and reflects the laser beam to a predetermined area to form a projection image;

wherein the first axis is located in the first plane, or the first axis is parallel to the first plane;

the light source scanner and the MEMS scanning mirror each are set as a single-axis driving structure; and the light source scanner further comprises a substrate and a piezoelectric actuator, the piezoelectric actuator is disposed on the substrate, the micro laser diodes are disposed on an upper surface of the piezoelectric actuator, the micro laser diodes comprises a red micro laser diode, a green micro laser diode and a blue micro laser diode, and the micro laser diodes are packaged on a surface of the piezoelectric actuator by wire bonding or flip-chip and the electrodes of the micro laser diodes are electrically connected to the electrical pads or paths of the piezoelectric actuator, and the electrical pads or paths are formed by evaporation or sputtering.

2. The laser projection device according to claim 1, wherein a scan frequency of the light source scanner is higher than a scan frequency of the MEMS scanning mirror.

3. The laser projection device according to claim 1, wherein the laser projection device further comprises a scanning signal synchronizing module, and the scanning signal synchronizing module sends a driving signal to the light source scanner and the MEMS scanning mirror respectively, the light source scanner and the MEMS scanning mirror are controlled synchronously to generate a raster scan pattern.

4. The laser projection device according to claim 1, wherein the scan frequency of the light source scanner is equal to or greater than 20 kHz, the scan frequency of the MEMS scanning mirror is in the range of 60 Hz-120 Hz.

5. The laser projection device according to claim 1, wherein the laser projection device further comprises an optical lens module disposed on a laser beam path, and the optical lens module is used to converge and trim the laser beam, the optical lens module is disposed between the light source scanner and the MEMS scanning mirror or disposed between the MEMS scanning mirror and the predetermined area.

6. The laser projection device according to claim 1, wherein the light source scanner operates in a first-order resonant mode or a second-order resonant mode.

7. The laser projection device according to claim 1, wherein the laser beams emitted by the micro laser diodes are perpendicular to a lengthwise direction of the piezoelectric actuator and located in the first plane, the MEMS scanning mirror is disposed perpendicular to the lengthwise direction of the piezoelectric actuator, and the laser beams are finally reflected to the predetermined area in the lengthwise direction of the piezoelectric actuator to form a projection image; or, the laser beams emitted by the micro laser diodes are emitted in the lengthwise direction of the piezoelectric actuator and located in the first plane, the MEMS scanning mirror is disposed in the lengthwise direction of the piezoelectric actuator, and the laser beams are finally reflected to the predetermined area perpendicular to the lengthwise direction of the piezoelectric actuator to form a projection image.

8. The laser projection device according to claim 1, wherein the laser projection device further comprises a micro laser diode driving module, wherein the micro laser diode driving module drives the micro laser diodes independently.

9. A laser projection system, wherein a laser projection device is disposed in the laser projection system, the laser projection device comprises a light source scanner and a MEMS scanning mirror, the light source scanner comprising one or more micro laser diodes; and the micro laser diodes are used to provide a laser beam needed by projection, and the laser beam is projected to the MEMS scanning mirror, and then reflected by the MEMS scanning mirror to a predetermined area to form a projection image;

wherein the light source scanner scans in a first plane and enables the laser beams of the light source scanner to project to the MEMS scanning mirror; and the MEMS scanning mirror scans about a first axis and reflects the laser beam to a predetermined area to form a projection image;

wherein the first axis is located in the first plane, or the first axis is parallel to the first plane;

the light source scanner and the MEMS scanning mirror each are set as a single-axis driving structure; and the light source scanner further comprises a substrate and a piezoelectric actuator, the piezoelectric actuator is disposed on the substrate, the micro laser diodes are disposed on an upper surface of the piezoelectric actuator, the micro laser diodes comprises a red micro laser diode, a green micro laser diode and a blue micro laser diode, and the micro laser diodes are packaged on a surface of the piezoelectric actuator by wire bonding or flip-chip and the electrodes of the micro laser diodes are electrically connected to the electrical pads or paths of the piezoelectric actuator, and the electrical pads or paths are formed by evaporation or sputtering.

10. The laser projection system according to claim 9, wherein the laser projection system is a pair of augmented reality glasses, and the laser projection device is disposed in a frame of the augmented reality glasses;

or, the laser projection system is a cell phone, and the laser projection device is embedded in the cell phone;

or, the laser projection system is a watch, and the laser projection device is embedded in a dial or a watchband of the watch.

11. The laser projection system according to claim 9, wherein a scan frequency of the light source scanner is higher than a scan frequency of the MEMS scanning mirror.

12. The laser projection system according to claim 11, wherein the scan frequency of the light source scanner is equal to or greater than 20 kHz, the scan frequency of the MEMS scanning mirror is in the range of 60 Hz-120 Hz.

13. The laser projection system according to claim 9, wherein the laser projection device further comprises a scanning signal synchronizing module, and the scanning signal synchronizing module sends a driving signal to the light source scanner and the MEMS scanning mirror respectively, the light source scanner and the MEMS scanning mirror are controlled synchronously to generate a raster scan pattern.

14. The laser projection system according to claim 9, wherein the laser projection device further comprises an optical lens module disposed on a laser beam path, and the optical lens module is used to converge and trim the laser beam, the optical lens module is disposed between the light source scanner and the MEMS scanning mirror or disposed between the MEMS scanning mirror and the predetermined area.

15. The laser projection system according to claim 9, wherein the light source scanner operates in a first-order resonant mode or a second-order resonant mode.

16. The laser projection system according to claim 9, wherein the laser beams emitted by the micro laser diodes are perpendicular to a lengthwise direction of the piezoelectric actuator and located in the first plane, the MEMS scanning mirror is disposed perpendicular to the lengthwise direction of the piezoelectric actuator, and the laser beams are finally reflected to the predetermined area in the lengthwise direction of the piezoelectric actuator to form a projection image; or, the laser beams emitted by the micro laser diodes are emitted in the lengthwise direction of the piezoelectric actuator and located in the first plane, the MEMS scanning mirror is disposed in the lengthwise direction of the piezoelectric actuator, and the laser beams are finally reflected to the predetermined area perpendicular to the lengthwise direction of the piezoelectric actuator to form a projection image.

17. The laser projection system according to claim 9, wherein the laser projection device further comprises a micro laser diode driving module, wherein the micro laser diode driving module drives the micro laser diodes independently.

* * * * *